US006644458B1

(12) United States Patent
Edslev-Christensen

(10) Patent No.: US 6,644,458 B1
(45) Date of Patent: Nov. 11, 2003

(54) CONVEYOR SYSTEM HAVING MEANS FOR SHIFTING ARTICLES BETWEEN PARALLEL CONVEYORS

(75) Inventor: Uffe Edslev-Christensen, Silkeborg (DK)

(73) Assignee: Crisplant A/S, Arhus N (DK)

( * ) Notice: Subject to any disclaimer, the term of this patent is extended or adjusted under 35 U.S.C. 154(b) by 44 days.

(21) Appl. No.: 10/018,225
(22) PCT Filed: Jun. 19, 2000
(86) PCT No.: PCT/DK00/00325
§ 371 (c)(1),
(2), (4) Date: Mar. 4, 2002
(87) PCT Pub. No.: WO00/78609
PCT Pub. Date: Dec. 28, 2000

(30) Foreign Application Priority Data

Jun. 18, 1999 (DK) .......................................... 1999 00872

(51) Int. Cl.$^7$ ...................... B65G 47/10; B65G 47/46; B65G 29/00; B65G 37/00; B65G 47/84
(52) U.S. Cl. ................................ 198/370.01; 198/465.1
(58) Field of Search ..................... 198/370.01, 346.1, 198/346.2, 465.1, 465.4, 468.6, 580

(56) References Cited

U.S. PATENT DOCUMENTS

| 3,776,395 A | | 12/1973 | Lingg et al. | |
| 3,785,510 A | | 1/1974 | Grooteboer | |
| 5,593,018 A | * | 1/1997 | Gosdowski et al. | ... 198/370.01 |
| 5,794,534 A | | 8/1998 | Enderlein et al. | |
| 5,842,555 A | | 12/1998 | Gannon et al. | |
| 5,934,444 A | * | 8/1999 | Kierpaul et al. | ......... 198/465.1 |
| 6,471,039 B1 | * | 10/2002 | Bruun et al. | ................ 198/577 |

FOREIGN PATENT DOCUMENTS

| DE | 87 14 976.1 | 3/1988 |
| DE | 197 53 525 A | 7/1998 |
| DE | 197 53 525 A1 | 7/1998 |
| DK | 168040 B1 | 8/1990 |
| DK | 168 040 B | 1/1994 |
| EP | 0 864 513 A2 | 9/1998 |
| FR | 2 128 871 | 10/1972 |
| GB | 2 197 633 A | 5/1988 |

* cited by examiner

Primary Examiner—Gene O Crawford
(74) Attorney, Agent, or Firm—Birch, Stewart, Kolasch & Birch, LLP

(57) ABSTRACT

A conveyor system for sorting articles to a plurality of receiving means is disclosed, in which cross-over means are arranged for shifting articles from a first conveyor, along which at least two induction stations and at least two discharge stations are arranged alternately, and to a second conveyor so as to short-cut the conveying path of articles that have been loaded onto the first conveyor at a first induction station and having the second discharge station as destination. Thereby, the conveying capacity of the first conveyor occupied by said articles is released as the articles do not pass the intermediate induction stations at which articles may be loaded onto the de occupied parts of the first conveyor and the sorting capacity of the conveyor system is increased. In particular, the system comprises two parallel conveyors and cross-over means for shifting articles between the two conveyors arranged so that the two conveyors function as short-cuts for each other.

15 Claims, 4 Drawing Sheets

CONVEYOR SYSTEM HAVING MEANS FOR SHIFTING ARTICLES BETWEEN PARALLEL CONVEYORS

This application is the national phase under 35 U.S.C. § 371 of PCT International Application No. PCT/DK00/00325 which has an International filing date of Jun. 19, 2000, which designated the United States of America and was published in English.

The present invention relates to a conveyor system for sorting articles, such as luggage, to a plurality of receiving means, in which cross-over means are arranged for shifting articles from a first conveyor, along which at least two induction stations and at least two discharge stations each comprising a plurality of receiving means are arranged alternately, and to a second conveyor so as to short-cut the conveying path of articles that have been loaded onto the first conveyor at a first induction station and having the second discharge station as destination. Thereby, the conveying capacity of the first conveyor occupied by said articles is released as the articles do not pass the at least one remaining induction station at which articles may be loaded onto the de-occupied parts of first conveyor and the sorting capacity of the conveyor system is increased.

In particular, the present invention relates to a system comprising two parallel conveyors and cross-over means for shifting articles between the two conveyors arranged so that the two conveyors function as short-cuts for each other.

BACKGROUND

Conveyor systems for sorting articles to a plurality of destinations are known from e.g. luggage handling systems of airport, at which luggage may be sorted by one main conveyor to 50–150 destinations or even more and each destination has a receiving means arranged along the conveying path of the conveyor assigned to it. Induction stations and discharge stations comprising each a plurality of receiving means may be arranged in various formations along the conveying path of the main conveyor, such as induction stations alternating with discharge station.

DESCRIPTION OF THE INVENTION

It is a problem for the sorting capacity of such a main sorter that articles may have to travel along most of the conveying path from they are loaded onto the conveyor and until they are discharged into a receiving means and thus occupying a part of the main conveyor for a long period and it is an object of the present invention to increase the conveying and sorting capacity of a conveyor system by shortening the occupation time for at least some of the articles.

This problem is solved by the present invention by means of arranging short-cuts by means of shifting means/cross-over means and a second conveyor for articles assigned to destinations of which the assigned receiving means are situated far away along the conveying path from the induction station at which said articles are loaded onto the main conveyor and thus releasing conveying capacity of the main conveyor so that said released capacity may be used by articles loaded onto the main conveyor at induction stations arranged along the conveying path in between the cross-over means and said receiving means to which the articles being shifted are assigned.

In a preferred embodiment of the present invention the conveyor system comprises two parallel conveyors and cross-over means for shifting articles between the two conveyors arranged so that the two conveyors function as short-cuts for each other. The system comprises two discharge stations each having a plurality of receiving means into which both conveyors may discharge articles and two induction stations for each conveyor, one arranged between the first and the second discharge station and one arranged between the second and the first discharge station.

Thus, the present invention relates to a method of operating a conveyor system comprising a first conveyor for conveying articles along a first conveying path defined by first stationary track means forming a closed loop on which track means the first conveyor moves, first discharge means for discharging articles from the first conveyor, first drive means for driving the first conveyor in a conveying direction of the first conveyor along the first conveying path, a first induction station arranged at a position along the first conveying path and comprising at least one loading means for loading articles onto the first conveyor, a second induction station arranged at a position along the first conveying path and comprising at least one loading means for loading articles onto the first conveyor, a first discharge station arranged at a position along the first conveying path in between the first induction station and the second induction station in the conveying direction of the first conveyor and comprising at least one receiving means for receiving articles being discharged from the first conveyor, a second discharge station arranged at a position along the first conveying path in between the second induction station and the first induction station in the conveying direction of the first conveyor and comprising at least one receiving means for receiving articles being discharged from the first conveyor, a second conveyor for conveying articles along a second conveying path defined by second stationary track means on which the second conveyor moves, the second conveying path passing at least one of the at least one receiving means of the second discharge station and said receiving means being arranged for receiving articles being discharged from the second conveyor, second discharge means for discharging articles from the second conveyor, second drive means for driving the second conveyor in a conveying direction of the second conveyor along the second conveying path, first cross-over means arranged along the first conveying path in between the first induction station and the first discharge station in the conveying direction of the first conveyor for receiving articles being discharged from the first conveyor onto the first cross-over means and for loading said articles onto the second conveyor at a position along the second conveying path being upstream of the second discharge station in the conveying direction of the second conveyor, and control means for controlling the operation of the conveyor system, the method comprising the steps of (a) loading articles onto the first conveyor by means of the loading means of the first induction station, each article being assigned to one of the receiving means of the first discharge station and the second discharge station, (b) discharging from the first conveyor at least some of the articles being assigned to a receiving means of the second discharge station that is arranged for receiving articles being discharged from the second conveyor onto the first cross-over means, (c) loading articles from the first cross-over means onto the second conveyor, (d) discharging articles from the second conveyor into the receiving means of the second discharge station to which the individual article is assigned, (e) discharging articles from the first conveyor into the receiving means of the first discharge station to which the individual article is assigned, (f) loading articles onto the first conveyor by means of the loading means of the second induction station, each article being assigned to one of the receiving means of the first discharge station and the second discharge station, and optionally (g) discharging articles from the first conveyor into the receiving means of the second discharge station to which the individual article is assigned.

The first conveyor and/or the second conveyor may be a sorter having a plurality of article supporting members each defining an article supporting surface and each having means for discharging articles being supported by the article supporting surface. The sorter may be a tilt-tray sorter so that the article supporting members are trays arranged pivotally each about an axis being substantially aligned with the conveying direction of said conveyor at the position of the tray, and wherein the discharging means can cause the tray to tilt from an article supporting position to an article discharging position in which the article supporting surface is inclined so as to discharge an article supported thereon and which means can cause the tray to be restored from the discharging position to the supporting position. Alternatively, the sorter may be a cross-belt sorter wherein the article supporting members each comprises an endless belt arranged movably in a direction substantially transversal to the conveying direction of said conveyor so that an upper surface of the belt constitutes the article supporting surface, wherein the discharging means comprises drive means for driving said movement of the belt so as to discharge an article supported thereon. As another alternative, the conveyors may be belt conveyors or the like and the articles may be placed in movable containers such as trays or totes that are conveyed by the conveyors.

The driving means may be drive chains driven by electric motors, linear motors etc.

Preferably, the second stationary track means forms a closed loop and the second conveying path passes at least one of the at least one receiving means of the first discharge station in between the second discharge station and the first cross-over means in the conveying direction of the second conveyor, said receiving means being arranged for receiving articles being discharged from the second conveyor, in which case the method further comprises the optional steps of (b1) discharging from the first conveyor at least some of the articles being assigned to a receiving means of the first discharge station that is arranged for receiving articles being discharged from the second conveyor onto the first cross-over means, and (d1) discharging articles from the second conveyor into the receiving means of the first discharge station to which the individual article is assigned.

The advantage of this configuration is that one of two articles assigned for the same receiving means of the first discharge station and placed on article supporting members of the first conveyor being too close to each other for both to be discharged at the first passage of the receiving means may be shifted to the second conveyor by means for the first cross-over means. Furthermore, the selection of articles to be shifted from the first conveyor to the second conveyor by means of the first cross-over means does not have to be completely free of errors.

According to a more preferred embodiment of the present invention, the conveyor system further comprises second cross-over means arranged along the first conveying path in between the second induction station and the second discharge station in the conveying direction of the first conveyor for receiving articles being discharged from the first conveyor onto the second cross-over means and for loading said articles onto the second conveyor at a position along the second conveying path in between the second discharge station and the first discharge station in the conveying direction of the second conveyor, and the method further comprises the steps of (f1) discharging from the first conveyor at least some of the articles being assigned to a receiving means of the first discharge station that is arranged for receiving articles being discharged from the second conveyor onto the second cross-over means, and (f2) loading articles from the second cross-over means onto the second conveyor.

Thereby, the second conveyor may also be used as a short-cut for articles being loaded onto the first conveyor at the second induction station and being assigned to receiving means of the first discharge station.

It is furthermore an advantage if the conveyor system further comprises a third induction station arranged at a position along the second conveying path and comprising at least one loading means for loading articles onto the second conveyor, in which case the method further comprises the step of (h) loading articles onto the first conveyor by means of the loading means of the first 35 induction station, each article being assigned to one of the receiving means of the first discharge station and the second discharge station. The conveyor system becomes much more flexible in this configuration and the conveying capacity of the second conveyor may be utilised to a higher degree.

In a most preferred embodiment which is both highly flexible and in which the conveying and sorting capacity of the conveyor system is utilised very efficiently, the conveyor system further comprises third cross-over means arranged along the second conveying path in between the first discharge station and the second discharge station in the conveying direction of the second conveyor for receiving articles being discharged from the second conveyor onto the third cross-over means and for loading said articles onto the first conveyor at a position along the first conveying path in between the first induction station and the first discharge station in the conveying direction of the first conveyor, a fourth induction station arranged along the second conveying path in between the second discharge station and the first discharge station in the conveying direction of the second conveyor and comprising at least one loading means for loading articles onto the second conveyor, fourth cross-over means arranged along the second conveying path in between the fourth induction station and the first discharge station in the conveying direction of the second conveyor for receiving articles being discharged from the second conveyor onto the fourth cross-over means and for loading said articles onto the first conveyor at a position along the first conveying path in between the second induction station and the second discharge station in the conveying direction of the first conveyor, wherein the third induction station is arranged along the second conveying path in between the first discharge station and the third cross-over means in the conveying direction of the second conveyor, and the method further comprises the steps of (i) discharging from the second conveyor at least some of the articles being assigned to a receiving means of the first discharge station onto the third cross-over means, (j) loading articles from the third cross-over means onto the first conveyor, (k) loading articles onto the second conveyor by means of the loading means of the fourth induction station, each article being assigned to one of the receiving means of the first discharge station and the second discharge station, (l) discharging from the second conveyor at least some of the articles being assigned to a receiving means of the second discharge station onto the fourth cross-over means, and (m) loading articles from the fourth cross-over means onto the first conveyor.

It is understood that more induction stations, discharge stations and cross-over means according to the present invention may be arranged along the first and/or the second conveyor and such conveyor systems may be operated according to the method of the present invention with obvious modifications.

Furthermore, the present invention relates to a conveyor system arranged as described above which may be operated according to the method of the present invention.

DETAILED DESCRIPTION OF THE FIGURES

The embodiment of a conveyor system according to the invention shown in FIGS. 1–4 comprises two layers of conveyors with a mutual vertical spacing between the layers. The discharge stations are arranged to receive articles from the conveyors of both layers thus increasing the degree of utilisation of the discharge stations. The two layers are of a substantially equal function and are operated in a similar manner.

Figure 1:
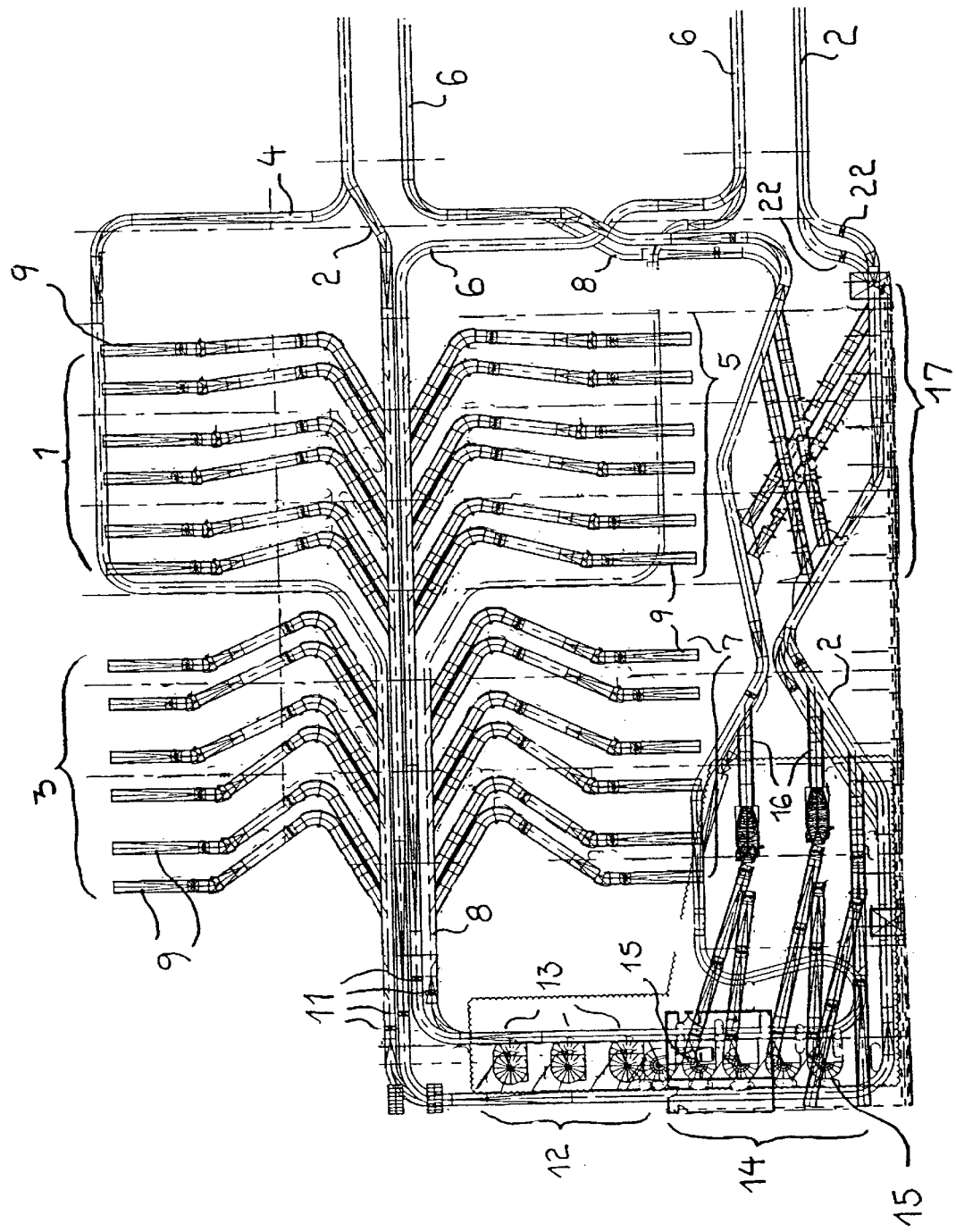
FIG. 1 is a schematic view of the left side part of the conveyor system.

The left side part of the conveyor system shown in FIG. 1 comprises an induction station 1 for the first conveyor 2 of the upper layer, an induction station 3 for the first conveyor 4 of the lower layer, an induction station 5 for the second conveyor 6 of the upper layer and an induction station 7 for the second conveyor 8 of the lower layer, each induction station 1, 3, 5, 7 comprises six loading means 9 for loading articles onto the respective conveyor. Each loading means 9 comprises a number of conveyor belt section of which the last section 10 is arranged with an angle of 30 degrees to the conveying direction of the respective conveyor 2, 4, 6, 8 so that the articles when loaded onto the trays of the conveyor 2, 4, 6, 8 will have a speed in the conveying direction of the conveyor 2, 4, 6, 8 being substantially equal to the conveying speed of the conveyor 2, 4, 6, 8, for the shown system about 2 m/s. However, the present invention is not depending on the conveying speed but may be applied to conveyors having a conveying speed within a wide range. All four conveyors 2, 4, 6, 8 have at the induction stations 1, 3, 5, 7 a conveying direction from right of left in FIG. 1.

Scanning means 11 are provided at each conveyor 2, 4, 6, 8 immediately downstream of the induction station 1, 3, 5, 7 for scanning an identity mark or tag of each of the articles conveyed on the conveyors 2, 4, 6, 8 and thus determine to which receiving means each article is assigned. The scanned information are communicated to a central control unit which controls the operation of the conveyor system. The scanning means 11 are means for scanning bar codes, but could alternatively be means for scanning an RFI-tag, for scanning characters using Optical Character Recognition or for scanning any other identification means for providing unique identity information or only destination information, i.e. to which receiving means the article is assigned to, for each article.

A discharge station 12 having three receiving means 13 that may receive articles being discharged from all four conveyors 2, 4, 6, 8 is arranged for receiving articles for special destinations. Another discharge station 14 having four receiving means 15 that may receive articles being discharged from all four conveyors 2, 4, 6, 8 is arranged immediately downstream of the previous discharge station 12 for receiving articles for which the scanning means 11 were not able to read the bar code of. These articles are manually rearranged and optionally provided with a new identification tag where after they are re-loaded onto the conveyors 2, 4, 6, 8 by means of reloading means 16.

A cross-over section 17 is arranged downstream of the discharge station in the conveying direction of the conveyors 2, 4, 6, 8. See FIG. 4 for details of a cross-over section 17 for the first conveyor 2 and the second conveyor 6 of the upper layer. The cross-over section 17 comprises two cross-over conveyors 18, 19 for receiving articles being discharged from the first conveyor 2 and loading said articles onto the second conveyor 6 and two cross-over conveyors 20, 21 for receiving articles being discharged from the second conveyor 6 and loading said articles onto the first conveyor 2. The cross-over conveyors 18-21 are arranged so that articles are discharged from a conveyor 2, 4, 6, 8 to a cross-over conveyor 1 821 upstream of the position at which other articles are loaded onto the conveyor from another cross-over conveyor 16-19 so that the trays from which articles have been discharged to one cross-over conveyor 18-21 are able to receive other articles from another cross-over conveyor 18-21. Two cross-over conveyors 18-21 are arranged from each conveyor 2, 4, 6, 8 to the other to increase the cross-over capacity because only every third or fourth tray may discharge an article at a given cross-over conveyor 18-21 due to technical limitations. A similar cross-over section (not shown) is arranged for the conveyors 4, 8 of the lower layer. The identity mark or tag of each of the articles is scanned again by second scanning means 22 arranged on each conveyor 2, 4, 6, 8 downstream of the cross-over section 17 to verify the identity of the articles. Some of the articles may have been turned over on the cross-over section 17 so that the tag is unreadable but the identity of such articles may be determined by the control means of the conveyor system form the identity of the adjacent articles and data about the order of the articles.

Figure 2:
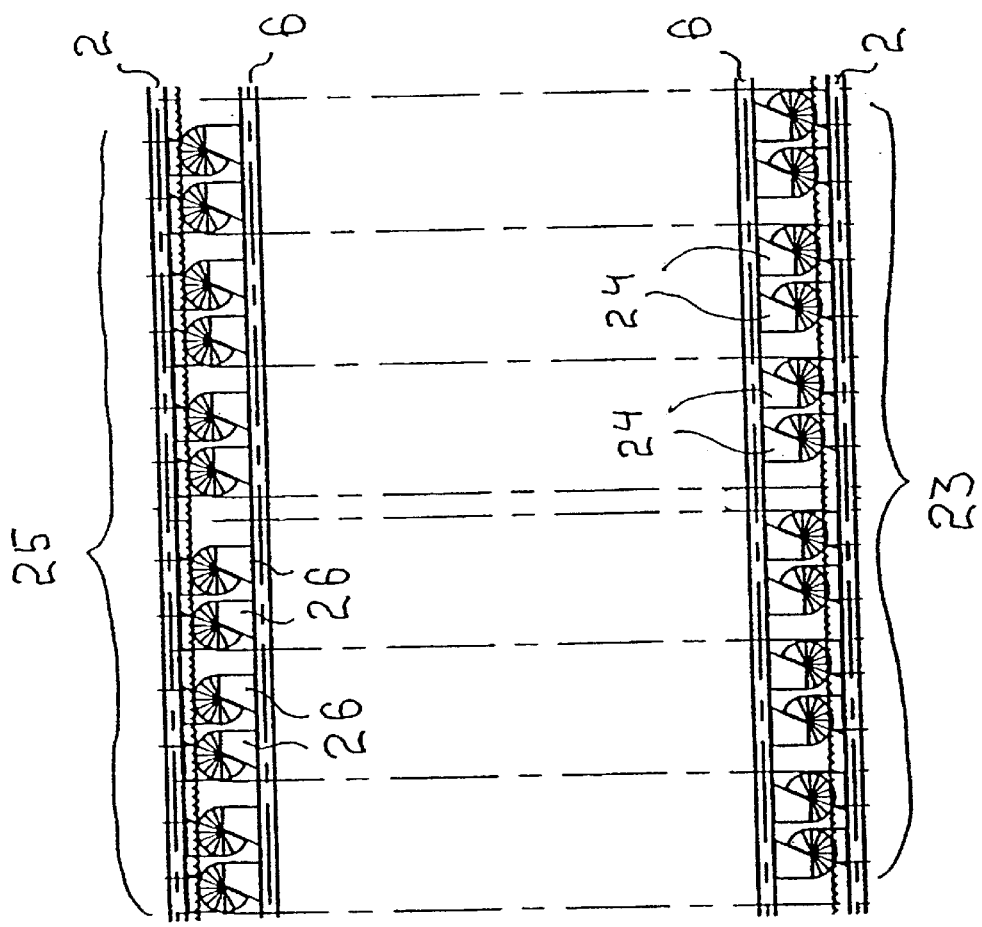
FIG. 2 is a schematic view of a section of the discharge area part of the conveyor system being arranged to the right of the part of FIG. 1.

The first conveyors 2, 4 move after the cross-over section 17 toward the first discharge station 23, see FIG. 2, which comprises in total forty receiving means 24 that each may receive articles being discharged from all four conveyors 2, 4, 6, 8, the first conveyors 2, 4 passing the first discharge station 23 from left to right and the second conveyors 6, 8 passing from right to left. The second conveyors 6, 8 move after the cross-over section 17 toward the second discharge station 25, see FIG. 2, which also comprises in total forty receiving means 26 that each may receive articles being discharged from all four conveyors 2, 4, 6, 8, the first conveyors 2, 4 passing the second discharge station 25 from right to left and the second conveyors 6, 8 passing from left to right.

Figure 3:
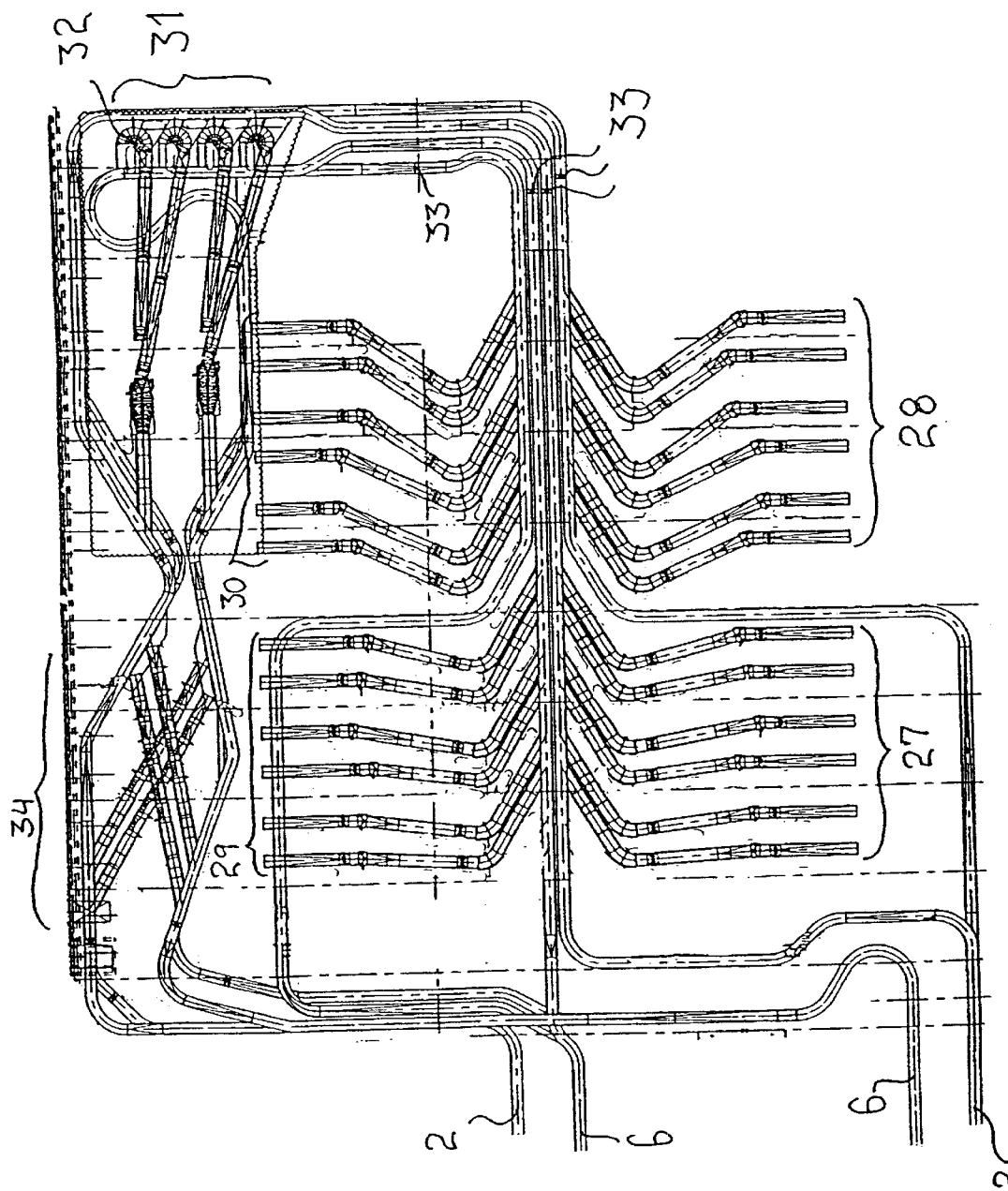
FIG. 3 is a schematic view of the right side part of the conveyor system being substantially equal in function to the part of FIG. 1 and being arranged to the right of the part of FIG. 2.
Figure 4:
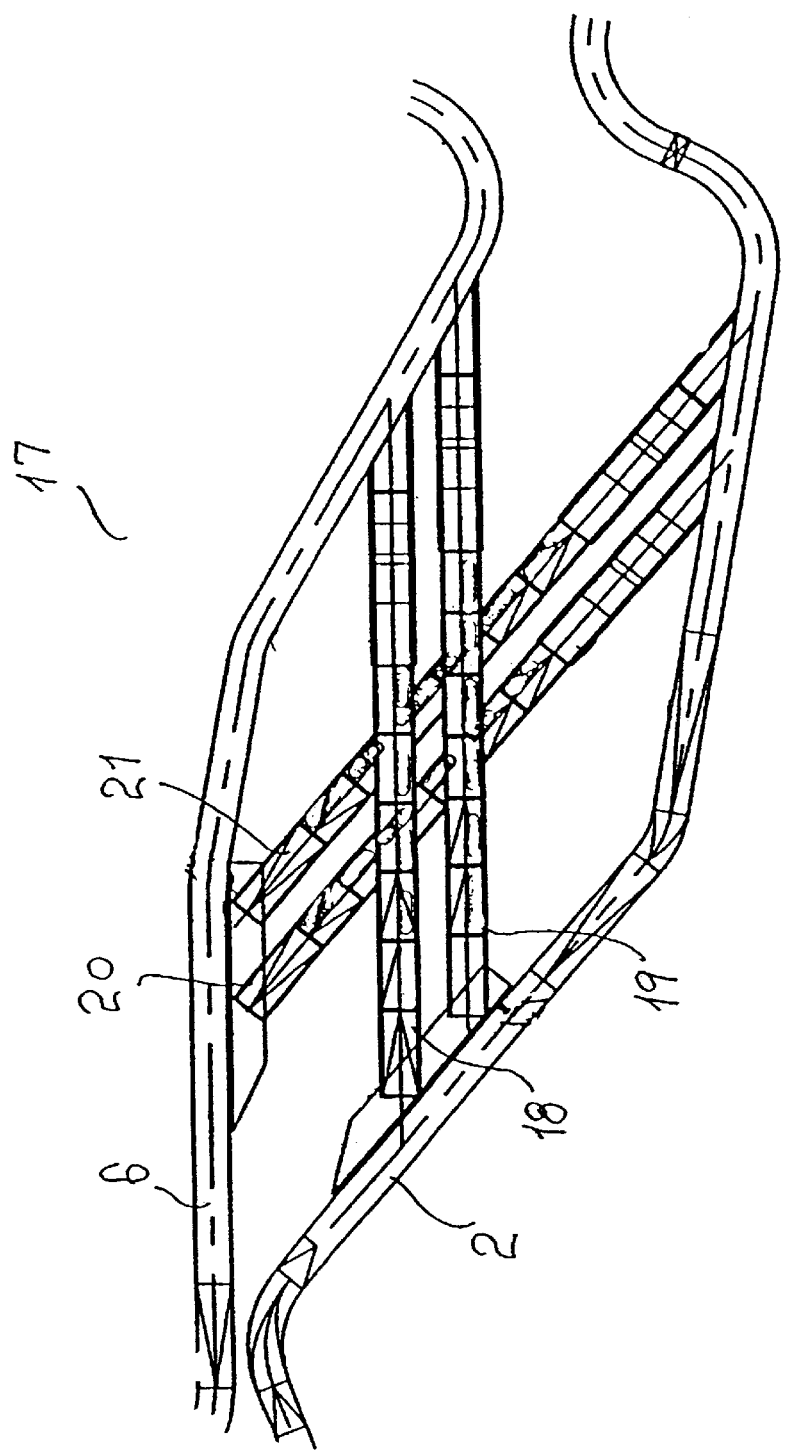
FIG. 4 is a detailed view of the cross-over section of the part of FIG. 1.

The right side part of the conveyor system shown in FIG. 3 is substantially similar to the left side part with second induction stations 27–30 for loading articles onto the conveyors 2, 4, 6, 8, respectively, a discharge station 31 having four receiving means 32 that may receive articles being discharged from all four conveyors 2, 4, 6, 8 for which articles the scanning means 33 were not able to read the bar code of and a second cross-over section 34. The conveyors 2, 4, 6, 8 pass the induction stations 27–30 from left to right.

Articles each being assigned to one of the receiving means 24, 26 of the discharge stations 23, 25 are loaded onto the first conveyor 2, 4 and the second conveyor 6, 8 at the respective induction stations 1, 3, 5, 7. At least some of the articles on the first conveyors 2, 4 that are assigned to receiving means 26 of the second discharge station 25 are shifted to unoccupied trays of the second conveyors 6, 8 at the cross-over section 17 and vice versa from the second conveyors 6, 8 to the first conveyors 2, 4 so that the conveyors 2, 4, 6, 8 are used as short-cuts for the articles to reach the correct receiving means 24, 26 without passing the second induction stations 27–30 whereby a higher number of unoccupied trays of the conveyors 2, 4, 6, 8 are available for articles at the second induction stations 27–30. Thus, the conveying capacity of the conveyor system is increased drastically.

What is claimed is:

1. A method of operating a conveyor system comprising
a first conveyor for conveying articles along a first conveying path defined by first stationary track means forming a closed loop on which track means the first conveyor moves,
first discharge means for discharging articles from the first conveyor,
first drive means for driving the first conveyor in a conveying direction of the first conveyor along the first conveying path,
a first induction station arranged at a position along the first conveying path and comprising at least one loading means for loading articles onto the first conveyor,
a second induction station arranged at a position along the first conveying path and comprising at least one loading means for loading articles onto the first conveyor,
a first discharge station arranged at a position along the first conveying path in between the first induction station and the second induction station in the conveying direction of the first conveyor and comprising at least one receiving means for receiving articles being discharged from the first conveyor,
a second discharge station arranged at a position along the first conveying path in between the second induction station and the first induction station in the conveying direction of the first conveyor and comprising at least one receiving means for receiving articles being discharged from the first conveyor,
a second conveyor for conveying articles along a second conveying path defined by second stationary track means on which the second conveyor moves, the second conveying path passing at least one of the at least one receiving means of the second discharge station and said receiving means being arranged for receiving articles being discharged from the second conveyor,
second discharge means for discharging articles from the second conveyor,
second drive means for driving the second conveyor in a conveying direction of the second conveyor along the second conveying path,
first cross-over means arranged along the first conveying path in between the first induction station and the first discharge station in the conveying direction of the first conveyor for receiving articles being discharged from the first conveyor onto the first cross-over means and for loading said articles onto the second conveyor at a position along the second conveying path being upstream of the second discharge station in the conveying direction of the second conveyor, and
control means for controlling the operation of the conveyor system, the method comprising the steps of
   (a) loading articles onto the first conveyor by means of the loading means of the first induction station, each article being assigned to one of the receiving means of the first discharge station and the second discharge station,
   (b) discharging from the first conveyor at least some of the articles being assigned to a receiving means of the second discharge station that is arranged for receiving articles being discharged from the second conveyor onto the first cross-over means,
   (c) loading articles from the first cross-over means onto the second conveyor,
   (d) discharging articles from the second conveyor into the receiving means of the second discharge station to which the individual article is assigned,
   (e) discharging articles from the first conveyor into the receiving means of the first discharge station to which the individual article is assigned,
   (f) loading articles onto the first conveyor by means of the loading means of the second induction station, each article being assigned to one of the receiving means of the first discharge station and the second discharge station, and optionally
   (g) discharging articles from the first conveyor into the receiving means of the second discharge station to which the individual article is assigned.

2. A method according to claim 1, wherein the second stationary track means forms a closed loop and the second conveying path passes at least one of the at least one receiving means of the first discharge station in between the second discharge station and the first cross-over means in the conveying direction of the second conveyor, said receiving means being arranged for receiving articles being discharged from the second conveyor, the method further comprising the optional steps of (b1) discharging from the first conveyor at least some of the articles being assigned to a receiving means of the first discharge station that is arranged for receiving articles being discharged from the second conveyor onto the first cross-over means, and (d1) discharging articles from the second conveyor into the receiving means of the first discharge station to which the individual article is assigned.

3. A method according to claim 2, wherein the conveyor system further comprises second cross-over means arranged along the first conveying path in between the second induction station and the second discharge station in the conveying direction of the first conveyor for receiving articles being discharged from the first conveyor onto the second cross-over means and for loading said articles onto the second conveyor at a position along the second conveying path in between the second discharge station and the first discharge station in the conveying direction of the second conveyor, the method further comprising the steps of (f1) discharging from the first conveyor at least some of the articles being assigned to a receiving means of the first discharge station that is arranged for receiving articles being discharged from the second conveyor onto the second cross-over means, and (f2) loading articles from the second cross-over means onto the second conveyor.

4. A method according to claim 2, wherein the conveyor system further comprises a third induction station arranged at a position along the second conveying path and comprising at least one loading means for loading articles onto the second conveyor, the method comprising the step of (h) loading articles onto the first conveyor by means of the loading means of the first induction station, each article being assigned to one of the receiving means of the first discharge station and the second discharge station.

5. A method according to claim 3, wherein the conveyor system further comprises third cross-over means arranged along the second conveying path in between the first discharge station and the second discharge station in the conveying direction of the second conveyor for receiving articles being discharged from the second conveyor onto the third cross-over means and for loading said articles onto the first conveyor at a position along the first conveying path in between the first induction station and the first discharge station in-the conveying direction of the first conveyor, a fourth induction station arranged along the second conveying path in between the second discharge station and the first discharge station in the conveying direction of the second conveyor and comprising at least one loading means for loading articles onto the second conveyor, forth cross-over means arranged along the second conveying path in between the fourth induction station and the first discharge station in the conveying direction of the second conveyor for receiving articles along being discharged from the second conveyor onto the fourth cross-over means and for loading said articles onto the first conveyor at a position along the first conveying path in between the second induction station and the second discharge station in the conveying direction of the first conveyor, wherein the third induction station is arranged along the second conveying path in between the first discharge station and the third cross-over means in the conveying direction of the second conveyor, the method further comprising the steps of (i) discharging from the second conveyor at least some of the articles being assigned to a receiving means of the first discharge station onto the third cross-over means, (j) loading articles from the third cross-over means onto the first conveyor, (k) loading articles onto the second conveyor by means of the loading means of the fourth induction station, each article being assigned to one of the receiving means of the first discharge station and the second discharge station, (l) discharging from the second conveyor at least some of the articles being assigned to a receiving means of the second discharge station onto the fourth cross-over means, and (m) loading articles from the fourth cross-over means onto the first conveyor.

6. A conveyor system comprising a first conveyor for conveying articles along a first conveying path defined by first stationary track means forming a closed loop on which track means the first conveyor moves, first discharge means for discharging articles from the first conveyor, first drive means for driving the first conveyor in a conveying direction of the first conveyor along the first conveying path, a first induction station arranged at a position along the first conveying path and comprising at least one loading means for loading articles onto the first conveyor, a second induction station arranged at a position along the first conveying path and comprising at least one loading means for loading articles onto the first conveyor, a first discharge station arranged at a position along the first conveying path in between the first induction station and the second induction station in the conveying direction of the first conveyor and comprising at least one receiving means for receiving articles being discharged from the first conveyor, a second discharge station arranged at a position along the first conveying path in between the second induction station and the first induction station in the conveying direction of the first conveyor and comprising at least one receiving means for receiving articles being discharged from the first conveyor, a second conveyor for conveying articles along a second conveying path defined by second stationary track means on which the second conveyor moves, the second conveying path passing at least one of the at least one receiving means of the second discharge station and said receiving means being arranged for receiving articles being discharged from the second conveyor, second discharge means for discharging articles from the second conveyor, second drive means for driving the second conveyor in a conveying direction of the second conveyor along the second conveying path, first cross-over means arranged along the first conveying path in between the first induction station and the first discharge station in the conveying direction of the first conveyor for receiving articles being discharged from the first conveyor onto the first cross-over means and for loading said articles onto the second conveyor at a position along the second conveying path being upstream of the second discharge station in the conveying direction of the second conveyor, and control means for controlling the operation of the conveyor system.

7. A conveyor system according to claim 6 and further comprising a third induction station arranged at a position along the second conveying path and comprising at least one loading means for loading articles onto the second conveyor.

8. A conveyor system according to claim 6, wherein the second conveyor is a sorter having a plurality of article supporting members each defining an article supporting surface and each having means for discharging articles being supported by the article supporting surface.

9. A conveyor system according to claim 6, wherein the first conveyor is a sorter having a plurality of article supporting members each defining an article supporting surface and each having means for discharging articles being supported by the article supporting surface.

10. A conveyor system according to claim 9, wherein the article supporting members are trays arranged pivotally each about an axis being substantially aligned with the conveying direction of said conveyor at the position of the tray, and wherein the discharging means can cause the tray to tilt from an article supporting position to an article discharging position in which the article supporting surface is inclined so as to discharge an article supported thereon and which means can cause the tray to be restored from the discharging position to the supporting position.

11. A conveyor system according to claim 9, wherein the article supporting members each comprising an endless belt arranged movably in a direction substantially transversal to the conveying direction of said conveyor so that an upper surface of the belt constitutes the article supporting surface, wherein the discharging means comprises drive means for driving said movement of the belt so as to discharge an article supported thereon.

12. A conveyor system according to claim 6, wherein the second stationary track means forms a closed loop and the second conveying path passes at least one of the at least one receiving means of the first discharge station in between the second discharge station and the first cross-over means in the conveying direction of the second conveyor, said receiving means being arranged for receiving articles being discharged from the second conveyor.

13. A conveyor system according to claim 12 further comprising second cross-over means arranged along the first conveying path in between the second induction station and the second discharge station in the conveying direction of the first conveyor for receiving articles being discharged from the first conveyor onto the second cross-over means and for loading said articles onto the second conveyor at a position along the second conveying path in between the second discharge station and the first discharge station in the conveying direction of the second conveyor.

14. A system according to claim 13 and further comprising third cross-over means arranged along the second conveying path in between the first discharge station and the second discharge station in the conveying direction of the second conveyor for receiving articles being discharged from the second conveyor onto the third cross-over means and for loading said articles onto the first conveyor at a position along the first conveying path in between the first induction station and the first discharge station in the conveying direction of the first conveyor, a fourth induction station arranged along the second conveying path in between the second discharge station and the first discharge station in the conveying direction of the second conveyor and comprising at least one loading means for loading articles onto the second conveyor, fourth cross-over means arranged along the second conveying path in between the fourth induction station and the first discharge station in the conveying direction of the second conveyor for receiving articles being discharged from the second conveyor onto the fourth cross-over means and for loading said articles onto the first conveyor at a position along the first conveying direction of the first conveyor, wherein the third induction station is arranged along the second conveying path in between the first discharge station and the third cross-over means in the conveying direction of the second conveyor.

15. A conveyor system according to claim 14, wherein the first cross-over means and the third cross-over means are arranged so that articles may be discharged from the first conveyor onto the first cross-over means at a position along the first conveying path being upstream in the conveying direction of the first conveyor to the position at which the third cross-over means may load articles onto the first conveyor and so that articles may be discharged from the second conveyor onto the third cross-over means at a position along the second conveying path being upstream in the conveying direction of the second conveyor to the position at which the first cross-over means may load articles onto the second conveyor, and the second cross-over means and the fourth cross-over means are arranged so that articles may be discharged from the first conveyor onto the second cross-over means at a position along the first conveying path being upstream in the conveying direction of the first conveyor to the position at which the fourth cross-over means may load articles onto the first conveyor and so that articles may be discharged from the second conveyor onto the fourth cross-over means at a position along the second conveying path being upstream in the conveying direction of the second conveyor to the position at which the second cross-over means may load articles onto the second conveyor.

* * * * *